R. S. FRAME.
Horse Hay-Fork.
No. 84,540.  Patented Dec. 1, 1868.
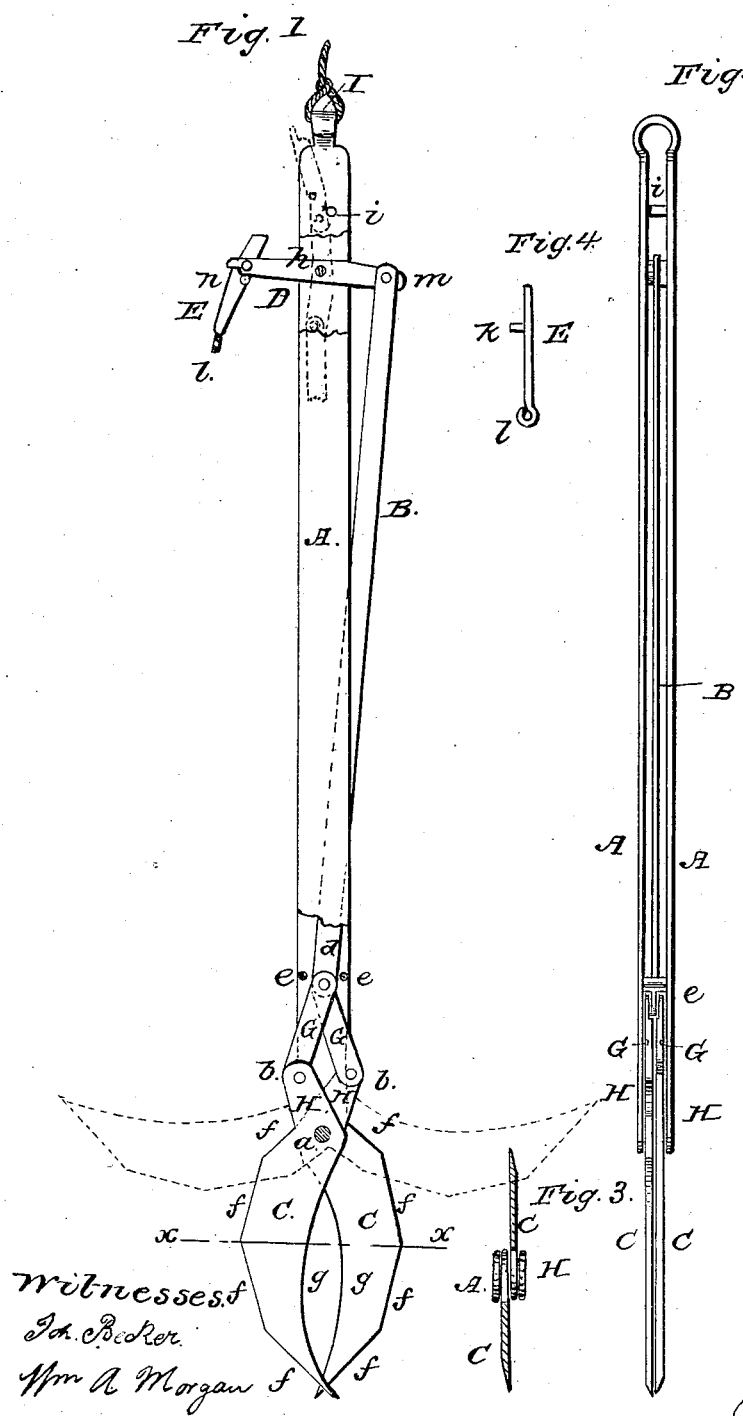

ROLAND S. FRAME, OF WASHINGTON, OHIO.

Letters Patent No. 84,540, dated December 1, 1868.

IMPROVEMENT IN HORSE HAY-FORKS.

The Schedule referred to in these Letters Patent and making part of the same.

*To all whom it may concern:*

Be it known that I, ROLAND S. FRAME, of Washington, in the county of Guernsey, and State of Ohio, have invented a new and useful Improvement in Hay-Forks; and I do hereby declare that the following is a full, clear, and exact description thereof, which will enable others skilled in the art to make and use the same, reference being had to the accompanying drawings, forming part of this specification, in which—

Figure 1 is a side view of my improved hay-fork when the same is pointed for thrusting into the hay.

Figure 2 is an edge view of the same.

Figure 3 is a cross-section of the blades through the line x x of fig. 1.

Figure 4 is a detail view of the tripping-lever.

Similar letters of reference indicate like parts.

The object of this invention is to furnish a simple, effective, and easily-operated hay-fork, of the class usually known as "horse-power hay-forks."

It consists in the combination of the tripping-levers with the shank-plates and the connecting-rod, as will be hereinafter more fully described.

In the accompanying drawings,

A A is the shank-plates, bent from a single plate of metal, leaving the loop or ring I.

C C are cutting and lifting-blades, having external angular cutting-edges, f f f, &c., and curved or concave internal or proximate edges, g, as shown, which edges taken together give a hook-form to the blades suitable to lifting hay.

The blades have extensions, H H, and are pivoted together at a.

The extensions are pivoted to plates G, as shown at b, and these plates are pivoted to a flat rod, B, by a single pivot-rivet, d.

e e are rivets passing through the plates A to stiffen the same, and serve as guides to the rod B.

The upper end of the rod B is pivoted to a lever, D, which latter is pivoted between the shank-plates by a pivot-rivet, h.

E is a tripping-lever, pivoted to the free end of the lever D, as shown.

i is a stop-rivet passing through the shank-plates, a little out of the line of the rivets h d a.

The blades are set for thrusting down into the hay by bringing the lever D horizontal, as shown in fig. 1. The points are brought together, as shown, with the angular cutting-edges f presented more or less obliquely, as shown.

When the fork has been thrust into the hay sufficiently far, the lever D is raised to the position shown in red outline, which will cause the rod B to extend the blades C C horizontally, as shown in red outline. The lever D will then be nearly in line with the rod B.

In this position the lower end of the tripping-lever E rests against the stop-rivet i, and thus limits the movement of the lever D in that direction.

k is a stud-pin, projecting from the side of the tripping-lever, near to the end of the lever D, and when the fork is set for lifting hay, this stud k comes into a jog, n, in the end of the lever D.

The tripping-line is attached to the ring l on the tripping-lever.

The ring l comes, when the fork is set for lifting, over the shoulder o of the shank-plates, as shown.

The rivet m, joining the lever D with the rod B, is then brought out of line with the rivets h d, and as the rivet i limits the movement of the lever D in one direction, and the rivet m is out of line in the other direction, a locking of the parts is obtained; but when the tripping-line attached to the ring l is jerked or pulled, the part p of the tripping-lever, acting against the rivet i, throws the pivot m past the line of the rivets h d, and the blades are left free to be closed by the downward pressure of the hay upon them.

Having thus described my invention,

I claim as new, and desire to secure by Letters Patent—

The levers E D, in combination with the plates A and connecting-rod B, arranged and operating as described, for the purpose specified.

The above specification of my invention signed by me, this 17th day of August, 1868.

ROLAND S. FRAME.

Witnesses:
OLIVER WITHROW,
GEORGE W. OURANT.